United States Patent
Masuki et al.

(10) Patent No.: US 6,730,725 B2
(45) Date of Patent: May 4, 2004

(54) POLYCARBONATE AND RESIN COMPOSITION

(75) Inventors: Tatsuya Masuki, Hiratsuka (JP); Hiroshi Yoshioka, Hiratsuka (JP); Takao Tayama, Kitakyushu (JP); Masaaki Miyamoto, Kitakyushu (JP)

(73) Assignee: Mitsubishi Engineering-Plastics Corp., Tokyo (JP)

( * ) Notice: Subject to any disclaimer, the term of this patent is extended or adjusted under 35 U.S.C. 154(b) by 34 days.

(21) Appl. No.: 10/119,552

(22) Filed: Apr. 10, 2002

(65) Prior Publication Data

US 2002/0193470 A1 Dec. 19, 2002

(30) Foreign Application Priority Data

Apr. 18, 2001 (JP) ........................................ 2001-119243

(51) Int. Cl.[7] .............................. C08K 5/34; C08K 5/42; C08K 5/09

(52) U.S. Cl. .................. 524/94; 524/100; 524/166; 524/284; 524/358; 524/611; 528/176

(58) Field of Search .......................... 524/94, 100, 166, 524/284, 358, 611; 528/176

(56) References Cited

U.S. PATENT DOCUMENTS 6,562,887 B1 * 5/2003 Kurasawa et al. ........... 524/269
6,586,508 B1 * 7/2003 Ooga et al. .................. 524/284

* cited by examiner

Primary Examiner—Kriellion A. Sanders
(74) Attorney, Agent, or Firm—Edwards & Angell, LLP; David G. Conlin, Esq.; Richard J. Roos, Esq.

(57) ABSTRACT

The present invention relates to a polycarbonate which can be obtained by a melting method and has a viscosity-average molecular weight of 16000 to 27000, and whose loss angle $\delta$ and complex viscosity $\eta^*$ (Pa·s) measured under the conditions of 250° C. and an angular velocity of 10 rad/s satisfy the following relation (1):

$$4{,}700 \leq \operatorname{Tan} \delta / (\eta^*)^{-0.87} \quad (1)$$

11 Claims, 1 Drawing Sheet

POLYCARBONATE AND RESIN COMPOSITION

BACKGROUND OF THE INVENTION

The present invention relates to a polycarbonate, more particularly to a polycarbonate having excellent impact resistance at low temperature and a resin composition containing the said polycarbonate.

Polycarbonates are widely used in many fields of industries as a resin with many advantageous properties such as high heat resistance, impact resistance and transparency. As to a method for producing polycarbonates, an interfacial method comprising reacting directly an aromatic dihydroxy compound such as bisphenol A with phosgene is generally used. However, in the interfacial method, there arise the problems such as poor thermal stability of the said polycarbonate and the corrosion of the mold at the time of injection molding caused by remaining methylene chloride in the polycarbonate. Therefore, a melting method comprising reacting an aromatic dihydroxy compound with a carbonic acid diester has been evaluated again because in addition to the advantages that there are no problems mentioned above in the interfacial method, polycarbonates can be produced by the melting method more inexpensive than those by the interfacial method.

However, comparing with the polycarbonate produced by the interfacial method, the polycarbonate produced by the melting method tends to reduce impact strength at low temperature, so that the polycarbonate is limited in practical use in which the impact strength at low temperature is especially required, such as automobile parts and OA equipment parts. As a method for improving the impact strength at low temperature of polycarbonate produced by the melting method, there are generally used a method of increasing the molecular weight and a method in which various elastomers are added into the polycarbonate. However, the molded article obtained by these methods has problems that flowabilty of polycarbonate is poor, color tone thereof is deteriorated and transparency thereof is deteriorated as the case.

SUMMARY OF THE INVENTION

An object of the present invention is to provide a polycarbonate having excellent impact resistance at low temperature and a resin composition containing the said polycarbonate.

As a result of the present inventor is earnest studies to attain the above object, it has been found that a polycarbonate obtained by a melting method and having a specific molecular weight and a specific melt viscoelasticity has better impact strength at low temperature than the other types of polycarbonate having the substantially same molecular weight. The present invention has been attained on the basis of the above finding.

Thus, in the first aspect of the present invention, there is provided a polycarbonate which can be obtained by a melting method and has a viscosity-average molecular weight of 16000 to 27000, and whose loss angle δ and complex viscosity η* (Pa·s) measured under the conditions of 250° C. and an angular velocity of 10 rad/s satisfy the following relation (1):

$$4{,}700 \leq \operatorname{Tan} \delta / (\eta^*)^{-0.87} \tag{1}$$

In the second aspect of the present invention, there is provided a polycarbonate resin composition comprising a polycarbonate (as defined in the first aspect) which can be obtained by a melting method and has a viscosity-average molecular weight of 16000 to 27000, and whose loss angle δ and complex viscosity η* (Pa·s) measured under the conditions of 250° C. and an angular velocity of 10 rad/s satisfy the following relation (1):

$$4{,}700 \leq \operatorname{Tan} \delta / (\eta^*)^{-0.87} \tag{1}$$

Figure 1:
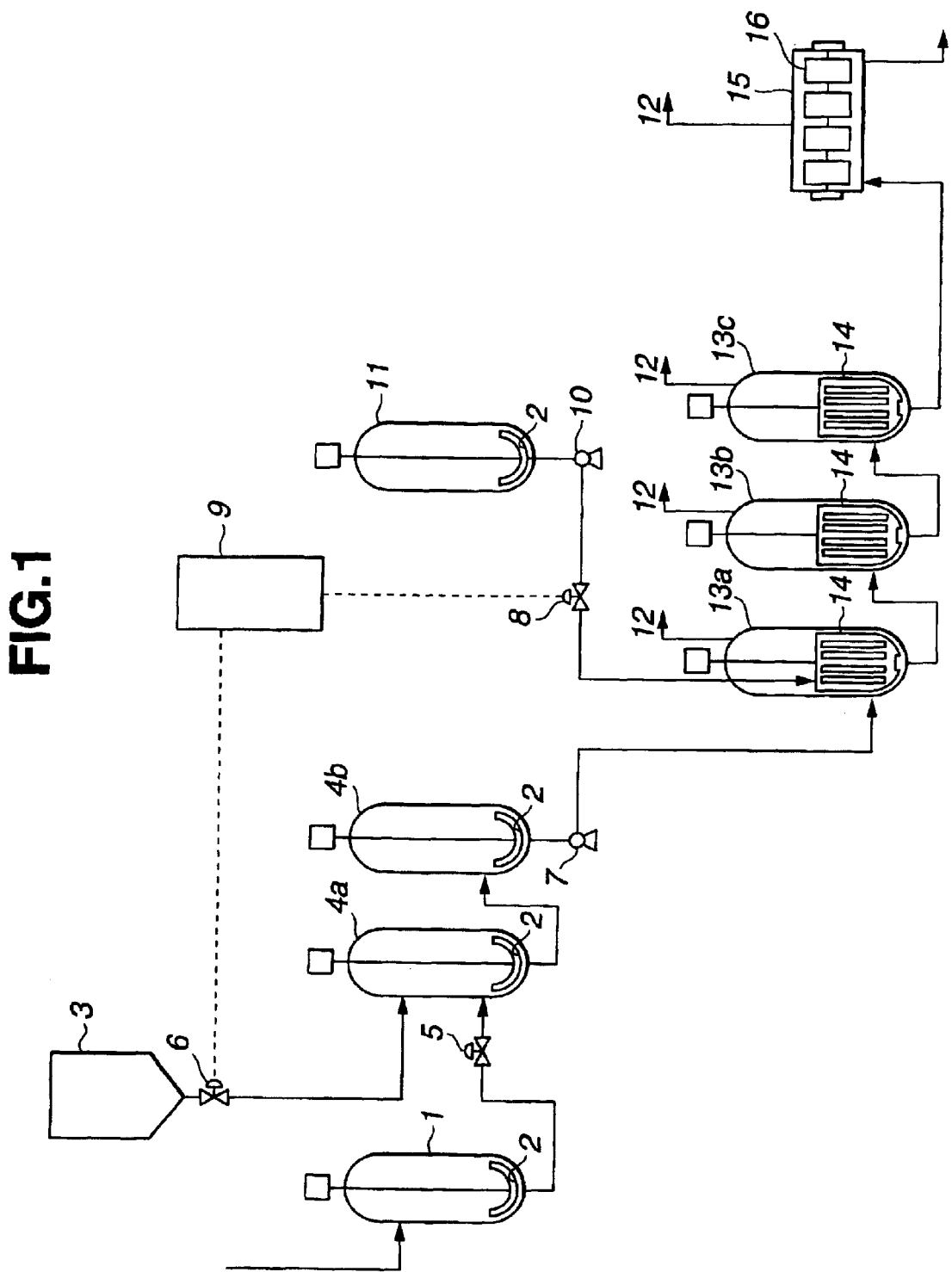
FIG. 1 is a flow sheet showing an example of the production method according to the present invention.

Each reference number used in the drawing shows as follows.
1: DPC tank, 2: agitator, 3: BPA hopper, 4a, 4b: material mixing tanks, 5: DPC flow rate control valve, 6: BPA flow rate control valve, 7: pump, 8: catalyst flow rate control valve, 9: program control unit, 10: pump, 11: catalyst tank, 12: by-product discharge pipe, 13a, 13b, 13c: vertical polymerizers, 14: Max Blend agitator, 16: gate paddle agitator.

DETAILED DESCRIPTION OF THE INVENTION

The present invention is described in detail below.

The polycarbonate according to the present invention is produced by a melting method using an aromatic dihydroxyl compound and a carbonic acid diester as starting materials.

Aromatic Hydroxyl Compounds

The aromatic hydroxyl compounds that can be used as one of the starting materials in the process of the present invention are the compounds represented by the following chemical formula (1)

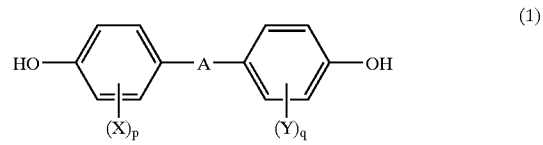

wherein A is an optionally substituted single-bond $C_1$–$C_{10}$ linear, branched or cyclic divalent hydrocarbon group, or a divalent group represented by —O—, —S—, —CO— or —SO$_2$—; X and Y are each a halogen atom or a $C_1$–$C_6$ hydrocarbon group; p and q are each an integer of 0 or 1, in which X and Y, and p and q, may be identical or different.

Representative examples of the said aromatic dihydroxyl compounds are bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-is(4-hydroxy-3,5-dimethylphenyl)propane, 2,2-bis(4-hydroxy-3,5-dibromophenyl)propane, 4,4-bis(4-hydroxyphenyl)heptane, 1,1-bis(4-hydroxyphenyl)cyclohexane, 4,4'-dihydroxybiphenyl, 3,3',5,5'-tetramethyl-4,4'-dihydroxybiphenyl, bis(4-hydroxyphenyl)sulfone, bis(4-hydroxyphenyl) sulfide, bis(4-hydlroxyphenyl) ether, and bis(4-hydroxyphenyl) ketone. These aromatic dihydroxyl compounds may be used either singly or as a combination of two or more. Of these compounds, 2,2-bis(4-hydroxyphenyl)propane (which may hereinafter be called "bisphenol A" and may be abbreviated as "BPA") is preferred.

Carbonic Acid Diesters

The carbonic acid diesters usable as another starting material in the present invention are the compounds represented by the following chemical formula (2).

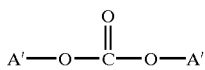
(2)

wherein A' is an optionally substituted $C_1$–$C_{10}$ linear, branched or cyclic monovalent hydrocarbon group, and two A's may be identical or different.

Typical examples of the said carbonic acid diesters are diphenyl carbonate, substituted diphenyl carbonates such as ditolyl carbonate, and dialkyl carbonates such as dimethyl carbonate, diethyl carbonate and di-t-butyl carbonate. These carbonic acid diesters may be used either singly or by mixing two or more of them. Of these compounds, diphenyl carbonate (which may hereinafter be abbreviated as "DPC") and substituted diphenyl carbonate are preferred.

The said carbonic acid diesters may be substituted, by an amount of preferably not more than 50% by mole, more preferably not more than 30% by mole, with a dicarboxylic acid or a dicarboxylic acid ester. Typical examples of such dicarboxylic acids or dicarboxylic acid esters are terephthalic acid, isophthalic acid, diphenyl terephthalate, and diphenyl isophthalate. When the carbonic acid diesters are substituted with such dicarboxylic acids or dicarboxylic acid esters, there are obtained polyester carbonates.

These carbonic acid diesters (which include the substituted dicarboxylic acids and dicarboxylic acid esters) are usually used in an excess amount over the aromatic dihydroxyl compound, specifically in a molar ratio to the aromatic dihydroxyl compound in the range of 1.001 to 1.3, preferably 1.01 to 1.2. When the molar ratio of the carbonic acid diester to the aromatic dihydroxyl compound is less than 1.001, the terminal OH groups of the produced polycarbonate are increased to deteriorate its thermal stability and hydrolytic resistance. When the said molar ratio exceeds 1.3, although the terminal OH groups of the produced polycarbonate are decreased, there arises a tendency for the ester exchange reaction to slow down under the same conditions, making it hard to produce a polycarbonate having the desired molecular weight. In the present invention, a polycarbonate with its terminal OH group content falling within the range of 50 to 1,000 ppm is preferably used.

Concerning the way of supply of the starting materials to their mixing tank, in view of the fact that higher metering precision is provided when the materials are in a liquid state, preferably one or both of the starting materials (an aromatic dihydroxyl compound and a carbonic acid diester) are melted and supplied in a liquid state. In case where the starting material(s) is(are) supplied in a liquid state, an oval flowmeter, micro-motion flowmeter or the like can be used as feed meter.

In case of supplying the materials in a solid state, it is more preferable to use a meter of the weight measuring type, such as belt type or loss-in-weight type weight feeder, than to use a volume measuring type such as screw feeder. Of these, the loss-in-weight type is especially preferred.

Ester Exchange Catalysts

Usually a catalyst is used in producing polycarbonates by the melting method. In the polycarbonate production process of the present invention, although the type of the catalyst used is not specified, generally alkali metal compounds, alkaline earth metal compounds and basic compounds such as basic boron compounds, basic phosphorus compounds, basic ammonium compounds and amine-based compounds are used. These compounds may be used singly or as a combination of two or more.

Catalyst is used in an amount within the range of 0.05 to 4 μmol, preferably 0.08 to 3 μmol, more preferably 0.1 to 2 μmol, based on mole of the aromatic dihydroxyl compound. If the amount of the catalyst used is below the above-defined range, there may not be obtained sufficient polymerization activity for producing a polycarbonate of the desired molecular weight, while if the catalyst amount exceeds the above-defined range, the produced polymer may be poor in hue, and also branching of the polymer may advance to cause a reduction of fluidity required at the time of molding.

Examples of the alkali metal compounds usable as catalyst in the present invention include inorganic alkali metal compounds such as hydroxides, carbonates and hydrogencarbonates of lithium, sodium, potassium, rubidium and cesium, and organic alkali metal compounds such as alcoholates, phenolates and organic carboxylates. Of these alkali metal compounds, cesium compounds, especially cesium carbonate, cesium hydrogencarbonate and cesium hydroxide are preferred.

Examples of the alkaline earth metal compounds include inorganic alkaline earth metal compounds such as hydroxides and carbonates of beryllium, magnesium, calcium, strontium and barium, and organic alkaline earth metal compounds such as alcoholates, phenolates and organic carboxylates.

Examples of the basic boron compounds include sodium salts, potassium salts, lithium salts, calcium salts, magnesium salts, barium salts and strontium salts of tetramethylboron, tetraethylborone, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron and butyltriphenylboron.

Examples of the basic phosphorus compounds include trivalent phosphorus compounds such as triethylphosphine, tri-n-propylphosphine, tri-i-propylphosphine, tri-n-butylphosphine, triphenylphosphine and tributylphosphine, and quaternary salts derived from these compounds.

Examples of the basic ammonium compounds include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine-based compounds include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline.

Of these catalysts, alkali metal compounds are preferred for practical use.

In the present invention, ester exchange catalyst is used as a solvent solution. As solvent, there can be used, for example, water, acetone, alcohol, toluene, phenol, and other solvents capable of dissolving the aromatic dihydroxyl compound and carbonic acid diester used as starting materials. Of these solvents, water is preferred, and especially when an alkali metal compound is used as catalyst, it is preferably used as an aqueous solution.

The polycarbonate according to the present invention essentially has a viscosity-average molecular weight of 16,000 to 27,000, preferably 18,000 to 26,000. When the viscosity-average molecular weight is less than 16,000, the impact resistance thereof may be reduced. When the viscosity-average molecular weight is more than 27,000, the flowabilty thereof may be deteriorated.

It is an essential requirement for the polycarbonate of the present invention that its loss angle $\delta$ and complex viscosity $\eta^*$ (its unit is Pa·s) measured under the conditions of 250° C. and an angular velocity of 10 rad/s satisfy the following relation (1), preferably the relation (11), more preferably the relation (12). In the present invention, the value of Tan $\delta/(\eta^*)^{-0.87}$ was used as a parameter indicating melt viscoelasticity of the polycarbonate. When the value of Tan $\delta/(\eta^*)^{-0.87}$ is less than 4,700, the impact strength at low temperature may be reduced. When the value of Tan $\delta/(\eta^*)^{-0.87}$ is too large, the transferability tend to deteriorate. Therefore, Tan $\delta/(\eta^*)^{-0.87}$ is preferably not more than 7,500, more preferably not more than 7,000.

$$4{,}700 \leq \text{Tan } \delta/(\eta^*)^{-0.87} \tag{1}$$

$$5{,}000 \leq \text{Tan } \delta/(\eta^*)^{-0.87} \leq 7{,}500 \tag{11}$$

$$5{,}500 \leq \text{Tan } \delta/(\eta^*)^{-0.87} \leq 7{,}000 \tag{12}$$

Loss angle $\delta$ indicates the phase lag of strain vis-á-vis stress determined from the measurement of dynamic melt viscoelasticity, and it is generally known as one of the indices indicating the dynamic viscoelasticity behavior. A large value of $\delta$(Tan $\delta$) signifies strong viscous nature of viscoelasticity, and a small value of $\delta$ signifies to strong elastic nature. The factors that decide this value are complex, and among such factors are the type of the monomer used, copolymer composition, copolymer structure, molecular structural properties including the formula of branching such as number of branch points and length of branched chain, molecular weight, and molecular weight distribution.

It has been found with these polycarbonates produced by the interfacial method that when the value of $\delta$ (Tan $\delta$) is plotted against complex viscosity ($\eta^*$ (Pa·s)), which is an index of molecular weight, etc., in logarithmic coordinates, the measured values of $\delta$ are almost aligned on the straight line of Tan $\delta/(\eta^*)^{-0.87}$=ca. 8,000. (Here, the number –0.87 which is an index of $\eta^*$ indicates inclination of the said straight line, and Tan $\delta/(\eta^*)^{-0.87}$ indicates the value of Tan $\delta$ when the above straight line was extrapolated to $\eta^*$=1 (Pa·s). Thus, by using the value of Tan $\delta/(\eta^*)^{-0.87}$ as a parameter, it becomes possible to eliminate molecular weight (viscosity) dependency of loss angle. Such alignment of the $\delta$ values is not seen with the polycarbonates produced by the melting method, and it has been further found that the melting method polycarbonates with $4{,}700 \leq$ Tan $\delta/(\eta^*)^{-0.87}$ are excellent in impact resistance at low temperature.

As the reason why the melt viscoelasticity parameter specified in the present invention gives a good effect on impact resistance at low temperature of the polycarbonates, the fact may be pointed out that when the value of $\delta$ (Tan $\delta$) is too small, it is presumed that any undesirable side reaction may occur.

In the present invention, various additives such as stabilizer, ultraviolet absorber, release agent, frame retardant, colorant, etc., may be contained in the polycarbonate, and these additives may be added during production of the polycarbonate or before production of pellets. The products containing these additives may be here generally called "polycarbonates", but the above-shown relations specified in the present invention apply to the polycarbonates which contain none of these additives.

Production Method of Polycarbonate

In the present invention, any polycarbonate producing method can be used as far as it is a melting method and capable of producing a polycarbonate having the above-specified properties. For example, the following method can be used.

Usually, both raw materials are mixed by uniformly stirring in a mixing tank and then polymerized by adding a catalyst to form a polymer. Preferably, both raw materials, viz. an aromatic dihydroxyl compound and a carbonic acid diester, are continuously supplied to a mixing tank, and the resulting mixture and an ester exchange catalyst are continuously supplied together to a polymerizer. For stabilized production of the polymer having the specified properties of the present invention, a method which satisfies at least the following two conditions (1) and (2) is used.

(1) The "setting amount of catalyst", or the target amount of supply of catalyst for maintaining the amount of catalyst constant to 1 mole of the aromatic dihydroxyl compound or carbonic acid diester supplied to the polymerizer, is selected from the range of 0.05 to 4 $\mu$mol per 1 mole of the aromatic hydroxyl compound for every unit production time regulated by properly fractionalizing the whole production time. The "whole production time" corresponds to the material supply time for stable production of the polymer in the polymerizer, and does not include the polymer production time during the unstable periods such as at the time of start up, switching of grade and end of production.

(2) In at least 95% of each unit production time, the actual amount of ester exchange catalyst supplied (hereinafter referred to simply as "actual amount of catalyst") is maintained equal to the setting amount of catalyst±0.1 $\mu$mol for 1 mole of the aromatic hydroxyl compound.

In the above condition (1), the setting amount of catalyst need not be a fixed value throughout the whole production time; the whole production time may be fractionalized, and setting may be made for every unit production time.

This method is explained in detail below.

In case where the whole production time is a single-fraction unit production time, the actual amount of catalyst is maintained at a value of the setting amount of catalyst±0.1 $\mu$mol for 1 mole of the aromatic dihydroxyl compound in at least 95% of the whole production time. In case where the whole production time is fractionalized into plural unit production periods and the setting amount of catalyst is varied, the actual amount of catalyst is maintained at a value of the setting amount of catalyst±0.1 umol in at least 95% of each unit production time. In either case, the actual amount of catalyst is preferably maintained at a value of the setting amount of catalyst±0.08 $\mu$mol, more preferably at a value of the setting amount of catalyst±0.06 $\mu$mol. The ratio of the period in which the actual amount of catalyst is maintained at a controlled value should be at least 95% of the whole production time or each unit production time. The closer to 100% is this ratio, the better result can be expected. When the said ratio is less than 95%, it may be difficult to obtain a polymer having a desired molecular weight and a desired content of terminal OH groups, and particularly when the ratio of the time in which the actual amount of catalyst is more than the setting amount of catalyst is high, the produced polymer may deteriorate in hue and also branching of the polymer advances, so that it may be difficult to obtain a polymer which satisfies the relations specified in the present invention. Further, in this case, fluidity at the time of molding of the polymer tends to lower. It is possible to produce the polycarbonate of the present invention even when the production conditions at the time of polymerization reaction such as polymerization temperature, polymerization time and degree of reduction of pressure are changed, but such change of production conditions is not preferable because it may be difficult to produce the polymer stably. It has been found that only when the supply of catalyst is continued by maintaining the actual amount of catalyst within a limited variable range of setting amount of catalyst±0.1 μmol, it becomes possible to stably produce a polymer satisfying the specific relations defined in the present invention and having good properties such as narrow molecular weight distribution and excellent color tone, fluidity, heat resistance, mechanical properties, etc., without requiring any complex polymerization operation.

In order to maintain the said actual amount of catalyst within the range of the setting amount of catalyst±0.1 μmol, it is preferable to supply the catalyst while metering its flow rate by an appropriate meter such as oval flowmeter or micro-motion flowmeter.

For automatically controlling the catalyst supply, for example the metered values of the actual catalyst flow rate are successively input to a computer by which the said setting amount of catalyst is compared with the setting flow rate of catalyst calculated from the amount of the aromatic dihydroxyl compound or carbonic acid diester supplied to the material preparing tank. If any metered value of the actual flow rate of catalyst disagrees with the setting flow rate of catalyst, this result is transmitted to the catalyst metering/feeding device to adjust the valve opening so that the actual flow rate of catalyst will agree with the setting flow rate.

Here, automatic control of catalyst supply based on the successive intermittent metering system can be conducted in the same way as in the case of the continuous metering system when due consideration is given to the optimization of metering interval of the actual flow rate of catalyst, but continuous automatic metering system is preferred for obtaining the products with stabilized quality. If the catalyst flow rate can be automatically metered continuously, it becomes possible to rapidly and continuously control the supply of catalyst to the polymerizer, and as a result, the setting flow rate of catalyst is maintained constant, the deflections of viscosity-average molecular weight and terminal OH group content of the polycarbonate are minimized, the molecular weight distribution is narrowed, and there can thus be obtained the products which are uniform in properties such as color tone, fluidity, heat resistance and mechanical properties.

The period in which the actual amount of catalyst remained within the range of the setting amount of catalyst±0.1 μmol in the unit production time with a certain setting amount of catalyst can be easily judged from the result of metering made by the said metering means. In the case of continuous metering, it is judged whether the actual amount of catalyst has been maintained within the range of the setting amount of catalyst±0.1 μmol in at least 95% of the unit production time with the said setting amount of catalyst, by determining the cumulative time in which the actual amount of catalyst remained in the range of the setting amount of catalyst±0.1 μmol and the cumulative time in which the actual amount of catalyst ran out of the said range, from the curves showing the relation between the actual amount of the catalyst and the metering time. In the case of non-continuous metering, too, the above judgment can be made by incorporating statistical calculations or other method if the metering is successive.

In the present invention, the polymerization reaction (ester exchange reaction) is generally carried out in two or more polymerizers, that is, in two or more stages, usually 3 to 7 stages continuously, under the following conditions: temperature 150 to 320° C.; pressure normal to 1.33 Pa; average residence time =5 to 150 minutes. In each polymerizer, in order to expedite discharge of the phenol formed as a by-product with the progress of reaction, setting is made so that the temperature and the degree of vacuum are elevated stepwise while maintaining the above-defined reaction conditions. It is preferable to set the temperature as low as possible and the residence time as short as possible for preventing degradation of qualities such as hue of the produced polycarbonate.

For automatic control of the actual amount of catalyst in case of using plural polymerizers for multi-stage reaction, it is preferable that the amount of catalyst supplied be automatically controlled continuously, and in this case, it is necessary that metering and control be completed within ⅓ of the residence time of the first polymerizer.

The apparatus used for the said ester exchange reaction may be either vertical, tubular, tower type or horizontal. Usually, there are provided one or more vertical polymerizers equipped with a turbine impeller, paddle agitator, anchor agitator, Fulzone agitator (produced by Shinko Pantec Co., Ltd.), Sun Meler agitator (produced by Mitsubishi Heavy Industries Ltd.), Max Blend agitator (produced by Sumitomo Heavy Industries Ltd.), helical ribbon blender, torsional gate paddle agitator (produced by Hitachi Ltd.) or the like, and successively to this vertical polymerizer(s), there is provided a horizontal single-shaft polymerizer such as disc type or cage type, or a horizontal two-shaft polymerizer equipped with HVR, SCR, N-SCR (produced by Mitsubishi Heavy Industries Ltd.), Bibolac (produced by Sumitomo Heavy Industries Ltd.), spectacle impeller, gate paddle agitator (produced by Hitachi Ltd.), a twisted or wrenched impeller or a slanted impeller having both functions of a spectacle impeller and polymer feeder, or a combination thereof.

In the polycarbonate produced in the manner described above, there usually remain the starting monomeric materials, catalyst, aromatic hydroxyl compound and other low-molecular weight compounds such as polycarbonate oligomers which are formed as by-products in the ester exchange reaction. Particularly the starting monomeric materials and aromatic hydroxyl compound remain in large quantities and give adverse effect to the properties such as thermal aging resistance and hydrolytic resistance of the product, so that they are preferably removed from the product.

The method of removing these residual substances is not specified in the present invention; for instance, they may be evaporated away by a vented extruder. In this case, it is preferable to deactivate the residual basic ester exchange catalyst in the resin by adding an acidic compound or its precursor, as this suppresses the side reactions from occurring during evaporation, allowing efficient removal of the remaining monomeric materials and aromatic hydroxyl compound in the polymer.

The acidic compound or its precursor to be added in the above operation is not specifically defined; it is possible to use any acidic compound which has the effect of neutralizing the basic ester exchange catalyst used for the polycondensation reaction. Examples of such acidic compounds are Bronsted acids such as hydrochloric acid, nitric acid, boric acid, sulfuric acid, sulfurous acid, hypophosphorus acid, polyphosphoric acid, adipic acid, ascorbic acid, aspartic acid, azelaic acid, adenosinephosphoric acid, benzoic acid, formic acid, valeric acid, citric acid, glycolic acid, glutamic acid, cinnamic acid, succinic acid, acetic acid, tartaric acid, oxalic acid, p-toluenesulfinic acid, p-toluenesulfonic acid, naphthalenesulfonic acid, nicotinic acid, picric acid, picolinic acid, phthalic acid, terephthalic acid, propionic acid, benzenesulfinic acid, benzenesulfonic acid, malonic acid and maleic acid, and their esters. These acids may be used either singly or as a combination of two or more. Of these acidic compounds and their precursors, the sulfonic compounds or their esters, for example, p-toluenesulfonic acid, methyl p-toluenesulfonate and butyl p-toluenesulfonate are preferred.

Such an acidic compound or its precursor is added in an amount which is 0.1 to 50 times, preferably 0.5 to 30 times by mole the neutralized amount of the basic ester exchange catalyst used for the polycondensation reaction. The time of addition is free to choose as far as it is posterior to the polycondensation reaction. The way of addition, which is also not specifically restricted in the present invention, may be properly selected depending on the properties of the acidic compound or its precursor used, required conditions and other factors; it is possible to use, for instance, a method in which the compound or its precursor is added directly, a method in which it is dissolved in a proper solvent and added as such, or a method using a pellet or flake-like masterbatch.

The extruder used for the evaporation may be either single-screw type or twin-screw type. When using a twin-screw extruder, it is preferably an intermeshing screw type, with the screws rotating in the same direction or in the opposite directions. For the purpose of evaporation, the extruder is preferably provided with plural vents in the rear of the acidic compound feed port. The number of the vents is not restricted, but usually 2 to 10 vents are provided. In this extruder, if necessary additives such as stabilizer, ultraviolet absorber, release agent, colorant, etc., may be added and kneaded with the resin.

In the present invention, a polycarbonate mixture (C) shown as follows is also preferred. Thus, the polycarbonate mixture (C) mainly comprises a polycarbonate (A) obtained by a melting method and having a viscosity-average molecular weight of 16000 to 27000, and whose loss angle δ and complex viscosity η* (Pa·s) measured under the conditions of 250° C. and an angular velocity of 10 rad/s satisfy the above formula (1); and comprising a polycarbonate (B) obtained by an interfacial method, in which the polycarbonate mixture (C) satisfies the above formula (1). The polycarbonate mixture (C) also has the same properties of polycarbonate (A). Here, "mainly comprise" means comprising in an amount of more than 50% by weight based on the total weight of the polycarbonate mixture.

Polycarbonate Resin Composition

In the polycarbonate of the present invention, at least one additive selected from stabilizer, ultraviolet absorber, release agent, flame retardant and colorant may be contained in the polycarbonate as defined in the first aspect, to form a polycarbonate resin composition. Such additives are not specifically defined, and those commonly used in polycarbonates can be used.

The stabilizers usable as additive in the present invention include hindered phenol compounds, phosphorus compounds, sulfur compounds, epoxy compounds and hindered amine compounds. Of these compounds, at least one antioxidant selected from hindered phenol compounds and phosphorus compounds is preferably used.

The hindered phenol compound used here is preferably selected from those represented by the following chemical formula (3):

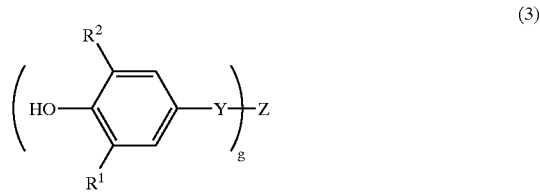

(3)

wherein $R^1$ and $R^2$ are each a $C_1$–$C_{10}$ hydrocarbon group and may be identical or different; Y is a $C_1$–$C_{20}$ hydrocarbon group which may contain a functional group selected from ester group, ether group and amide group, and/or a phosphorus atom; Z is a $C_1$–$C_6$ hydrocarbon group which may contain an oxygen atom and/or a nitrogen atom, a sulfur atom or a single bond; and g is an integer of 1 to 4.

Examples of such hindered phenol compounds are n-octadecyl-3-(3',5'-di-t-butyl-4'-hydroxyphenyl) propionate, 1,6-hexanediol-bis[3-(3,5-di-t-butyl-4-hydroxyphenyl)propionate], pentaerythrityl-tetrakis[3(3',5'-di-t-butyl-4'-hydroxyphenyl)propionate], 3,9-bis[1,1-dimethyl-2-{β(3-t-butyl-4-hydroxy-5-methylphenyl) propionyloxy}ethyl]-2,4,8,10-tetraoxaspiro[5,5]undecane, triethylene glycol-bis[3-(3-t-butyl-5-methyl-4-hydroxyphenyl)propionate], 3,5-di-t-butyl-4-hydroxybenzylphosphonate-diethylester, 1,3,5-trimethyl-2, 4,6-tris(3,5-di-t-butyl-4-hydroxybenzyl)benzene, 2,2-thio - diethylenebis[3-(3,5-di-t-butyl-4-hydroxyphenyl) propionate], tris-(3,5-di-t-butyl-4-hydroxybenzyl)-isocyanurate, and ,N'-hexamethylenebis(3,5-di-t-butyl-4-hydroxyhydrocinnamide). Of these compounds, n-octadecyl-3-(3',5'-di-t-butyl-4'-hydroxyphenyl) propionate, 1,6-hexanediol-bis[3-(3',5'-t-butyl-4'-hydroxyphenyl)propionate], and 3,9-bis[1,1-dimethyl-2-{β-(3-t-butyl-4-hydroxy-5-methylphenyl)propionyloxy}ethyl]-2,4,8,10-tetraoxaspiro[5,5]undecane are preferred.

The phosphorus compound used as stabilizer in the present invention is preferably a trivalent phosphorus compound, and it is preferably at least one compound selected from the phosphorous esters which have been esterified with a phenyl and in which at least one ester has a phenol and/or at least one $C_1$–$C_{25}$ alkyl group, and tetrakis (2,4-di-t-butylphenyl)-4,4'-biphenylenediphosphonite. Examples of such phosphorous esters are 4,4'-butylidene-bis(3-methyl-6-t-butylphenyl -ditridecyl)phosphite, 1,1,3-tris (2-methyl-4-ditridecylphosphite-5-t-butylphenyl) butane, trisnonylphenyl phosphite, dinonylphenyl-pentaerythritol diphosphite, tris(2,4-di-t-butylphenyl) phosphite, bis(2,4-di-t-butylphenyl)pentaerythritol diphosphite, di(2,6-d-t-butyl-4-methylphenyl) pentaerythritol diphosphite, 2,2'-ethylidene-bis(4,6-di-t-butylphenyl)fluorophosphite, 2,2'-methylene-bis(4,6-di-t-butylphenyl)octylphosphite, bis(2,4-dicumylphenyl) pentaerythritol diphosphite, phosphorous ester comprising mononoylphenol and dinonylphenol, and phosphorous esters having hindered phenols represented by the above-shown formula (3).

In the present invention, tetrakis(2,4-d-t-butylphenyl)-4,4'-biphenylene-diphosphonite, tris(2,4-di-t-butylphenyl) phosphite or 2,2'-methylene-bis(4,6-di-t-butylphenyl) octylphosphite are preferably used as phosphorus compound.

The stabilizer content in the polycarbonate is preferably not more than 1 part by weight, more preferably not more than 0.4 part by weight, based on 100 parts by weight of the polycarbonate. If its content exceeds 1 part by weight, there may arise the problems such as deterioration of hydrolytic resistance. When two or more types of stabilizer are used, their mixing ratio may be properly decided. Also, which stabilizer is to be used or whether two or more types of stabilizer should be used can be properly decided in consideration of the purpose of use of the product polycarbonate. Generally, the phosphorus compounds are effective for improving thermal stability during molding of the polycarbonate and for improving thermal stability of its molded article, while the phenol compounds are effective for improving thermal stability such as thermal aging resistance in use of the polycarbonate molded articles. Combined use of a phosphorus compound and a phenol compound contributes to the improvement of tinting.

The ultraviolet absorbers usable in the present invention include inorganic ultraviolet absorbers such as titanium oxide, cesium oxide and zinc oxide, and organic ultraviolet absorbers such as benzotriazole compounds, benzophenone compounds and triazine compounds. In the present invention, the organic ultraviolet absorbers are preferred, and it is particularly preferable to use one selected from benzotriazole compounds, 2-(4,6-diphenyl-1,3,5-triazine-2-yl)-5-[(hexyl)oxy]-phenol, 2-[4,6-bis(2,4-dimethylphenyl)-1,3,5-triazine-2-yl]-5-(octyloxy)phenol, 2,2'-(1,4-phenylene)bis[4H-3,1-benzoxadine-4-one], and [(4-methoxyphenyl)-methylene]-propanedioic acid-dimethylester.

Preferred examples of the benzotriazole compounds are those represented by the following chemical formula (4), and the condensate of methyl-3-[3-t-butyl-5-(2H-benzotriazole-2-yl)-4-hydroxyphenyl]propionate and polyethylene glycol.

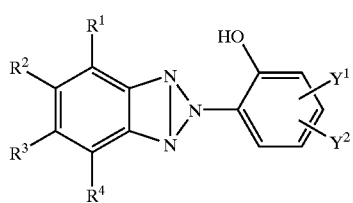

(4)

wherein $R^1$ to $R^4$ represent independently a hydrogen atom, a halogen atom or a $C_1$–$C_{12}$ hydrocarbon group; and $Y^1$ and $y^2$ represent independently a hydrogen atom or a $C_1$–$C_{40}$ hydrocarbon group which may contain a nitrogen atom and/or an oxygen atom.

Examples of the benzotriazole compounds of the formula (4) are 2-bis(5-methyl-2-hydroxyphenyl)benzotriazole, 2-(3,5-di-t-butyl-2-hydroxyphenyl)benzotriazole, 2-(3',5'-di-t-butyl-2'-hydroxyphenyl)-5-chlorobenzotriazole, 2-(3-t-butyl-5-methyl-2-hydroxyphenyl)-5-chlorobenzotriazole, 2-(2'-hydroxy-5'-t-octylphenyl)benzotriazole, 2-(3,5-di-t-amyl-2-hydroxyphenyl)benzotriazole, 2-[2-hydroxy-3,5-bisα, α dimethylbenzyl)phenyl]-2H-benzotriazole, [methyl-3-[3-t-butyl-5-(2H-benzotriazole-2-yl)-4-hydroxyphenyl] propionate-polyethylene glycol] condensate, and the compounds represented by the following chemical formula (5):

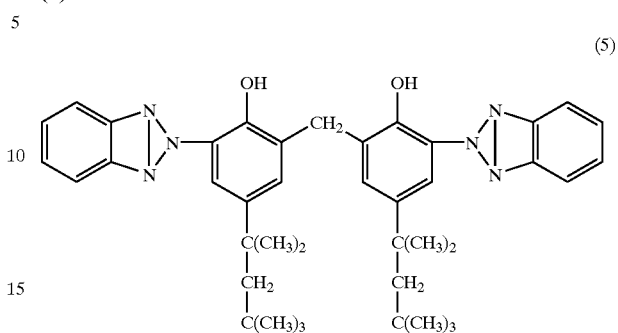

Particularly preferred in these compounds are 2-(2'-hydroxy-5'-t-octylphenyl)benzotriazole, 2-[2-hydroxy-3,5-bis (α, α-dimethylbenzyl)phenyl]-2H-benzotriazole, the compounds of the formula (5), 2-(4,6-diphenyl-1,3,5-triazine-2-yl)-5-[(hexyl)oxy]-phenol, and 2-[4,6-bis(2,4-dimethylphenyl)-1,3,5-triazine-2-yl]-5-(octyloxy)phenol.

The content of ultraviolet absorber in the composition is preferably not more than 5 parts by weight, more preferably not more than 1 part by weight, based on 100 parts by weight of the polycarbonate. If its content exceeds 5 parts by weight, there arise the problems such as contamination of the mold at the time of injection molding. It is possible to use either one ultraviolet absorber or two or more of ultraviolet absorbers as a mixture.

As release agent, at least one compound selected from aliphatic carboxylic acids, aliphatic carboxylic acid esters, aliphatic hydrocarbon compounds having a number-average molecular weight of 200 to 15,000 and polysiloxane-based silicone oil is used. It is preferred to use at least one compound selected from aliphatic carboxylic acids and aliphatic carboxylic acid esters.

As the aliphatic carboxylic acids usable as release agent in the present invention, saturated or unsaturated aliphatic monocarboxylic acids, dicarboxylic acids and tricarboxylic acids can be exemplified. Here, the aliphatic carboxylic acids include alicyclic carboxylic acids. Of these aliphatic carboxylic acids, mono- or dicarboxylic acids having 6 to 36 carbon atoms in the molecule are preferred, and aliphatic saturated monocarboxylic acids having 6 to 36 carbon atoms in the molecule are more preferred. Examples of such aliphatic carboxylic acids are palmitic acid, stearic acid, valeric acid, caproic acid, caprylic acid, lauric acid, arachic acid, behenic acid, lignoceric acid, cerotic acid, melissic acid, montanic acid, glutamic acid, adipic acid, and azelaic acid.

As the aliphatic carboxylic acid moiety of the aliphatic carboxylic acid ester, it is possible to use the above-mentioned aliphatic carboxylic acids. As the alcohol moiety of the said ester, saturated or unsaturated monohydric alcohols and saturated or unsaturated polyhydric alcohols can be used. These alcohols may have substituents such as fluorine atom or aryl group. Preferred of these alcohols are mono- or polyhydric saturated alcohols with a carbon number of not more than 30. Aliphatic saturated mono- or polyhydric alcohols with a carbon number of not more than 30 are more preferred. The "aliphatic alcohols" mentioned here include alicyclic alcohols. Examples of these alcohols are octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, and dipentaerythritol. These aliphatic carboxylic acid esters may contain aliphatic carboxylic acids and/or alcohols as impurities. They may comprise a mixture of plural compounds. Examples of the aliphatic carboxylic acid esters are beeswax (a mixture mainly composed of myricyl palmitate), stearyl stearate, behenyl behenate, octyldodecyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, and pentaerythritol tetrastearate.

The release agent is contained in an amount of preferably not more than 5 parts by weight, more preferably not more than 1 part by weight, based on 100 parts by weight of the polycarbonate. If its content exceeds 5 parts by weight, there may arise the problems such as decline of hydrolytic resistance and contamination of the mold during injection molding. The said release agents may be used either singly or as a combination of two or more.

In the present invention, flame retardant may be added into the polycarbonate resin composition, if required. It is known that a polycarbonate has relatively good flame retardancy as it is. Especially, a polycarbonate which can be obtained by a melting method and has a viscosity-average molecular weight of 16000 to 27000, and whose loss angle δ and complex viscosity η* (Pa·s) measured under the conditions of 250° C. and an angular velocity of 10 rad/s satisfy the following relation (13): is excellent in flame retardancy and other properties as it is, and it may not be required to add a flame retardant.

$$4{,}700 \leq \operatorname{Tan} \delta/(\eta^*)^{-0.87} \leq 6{,}000 \tag{13}$$

In case of adding a flame retardant, as the flame retardant, metal salt of sulfonic acid compounds, halogen containing compounds, antimony containing compounds, phosphorus containing compounds, silicone containing compounds, or the like are exemplified. Of these, at least one compound selected from the metal salt of sulfonic acid compounds is (are) preferred in view of preventing the reduction of mechanical strength.

As the metal salt of sulfonic acid compounds, metal salt of aliphatic sulfonic acid and metal salt of aromatic sulfonic acid are exemplified. As to the metal in the metal salt of sulfonic acid, alkaline metals such as sodium, lithium, potassium, rubidium and cesium, and alkaline earth metals such as beryllium, magnesium, calcium, strontium and barium, are preferred. The said metal salt of sulfonic acid compound may be used either singly or as a combination of two or more.

Preferable examples of the metal salt of sulfonic acid compounds in view of ability of flame retardancy and thermal stability, are metal salt of aromatic sulfone sulfonic acid, perfluoroalkane-metal salt of sulfonic acid. Preferable examples of the metal salt of aromatic sulfone sulfonic acid are alkaline metal salt of aromatic sulfone sulfonic acid and alkaline earth metal salt of aromatic sulfone sulfonic acid, which may be polymer compounds. Concrete examples of the metal salt of aromatic sulfone sulfonic acid are sodium salt of diphenylsulfone-3-sulfonic acid, potassium salt of diphenylsulfone-3-sulfonic acid, sodium salt of 4,4'-dibromodiphenyl-sulfone-3-sulfonic acid, potassium salt of 4,4'-dibromodiphenyl-sulfone-3-sulfonic acid, calcium salt of 4-chloro-4'-nitrodiphenylsulfone-3-sulfonic acid, sodium salt of diphenylsulfone-3,3'-disulfonic acid and dipotassium salt of diphenylsulfone-3,3'-disulfonic acid.

Preferable examples of the perfluoroalkane-metal sulfonates are perfluoroalkane-alkaline metal sulfonates and perfluoroalkane-alkaline earth metal sulfonates, more preferably alkaline metal sulfonates having $C_4$–$C_8$ perfluoroalkane group and alkaline earth metal sulfonates having $C_4$–$C_8$ perfluoroalkane group. Concrete examples of the perfluoroalkane-metal sulfonates are perfluorobutane-sodium salt of sulfonic acid, perfluorobutane-potassium salt of sulfonic acid, perfluoromethylbutane-sodium salt of sulfonic acid, perfluoromethylbutane-potassium salt of sulfonic acid perfluorooctane-sodium salt of sulfonic acid, perfluorooctane-potassium salt of sulfonic acid, perfluorobutane-tetraethyl ammonium salt of sulfonic acid.

The flame retardant is contained in an amount of preferably not more than 30 parts by weight based on 100 parts by weight of the polycarbonate. If its content exceeds 30 parts by weight, the thermal stability thereof may be deteriorated.

As colorant, the compounds having an anthraquinone skeleton and the compounds having a phthalocyanine skeleton can be used, the former being preferred in view of heat resistance.

Examples of the colorants usable in the present invention include the following commercial products: MACROLEX Blue, MACROLEX Violet 3R and MACROLEX Violet B (Bayer AG), Sumiplast Violet RR, Sumiplast Violet B and Sumiplast Blue OR (Sumitomo Chemical Industries Co., Ltd.), Diaresin Violet D, Diaresin Blue G and Diaresin Blue N (Mitsubishi Chemical Corporation).

Colorant is contained in an amount of preferably not more than 1 part by weight, more preferably not more than 0.5 part by weight based on 100 parts by weight of the polycarbonate. It is possible to use either one colorant or a mixture of two or more colorants.

The time and method of addition of the said additives such as stabilizer, ultraviolet absorber, release agent, flame retardant and colorant are not specifically defined. Regarding the time of addition, the said additives may be added, for example (A) in the course of polymerization reaction, (B) on conclusion of the polymerization reaction, or (C) after deactivation of the catalyst used for the polymerization and before pelletization. They may be added when the polycarbonate is in a molten state, such as in the course of kneading, but it is also possible to blend the additives with the polycarbonate in a solid state (such as in a state of pellet or powder) and then knead by an extruder. However, in view of inhibition of decomposition of the additives and prevention of coloring, it is preferable to add the additives either (a) in the course of polymerization reaction, (b) on conclusion of polymerization reaction, or (c) after deactivation of the catalyst used for the polymerization.

As for the way of addition, the said additives may be directly mixed or kneaded with the polycarbonate or may be added after dissolving them in a suitable solvent or forming a high-concentration masterbatch with a small quantity of polycarbonate or other resin. In case of using two or more of these compounds, they may be added either separately or all at one time to the polycarbonate.

The present invention is also designed to provide a polycarbonate resin composition having the desired properties, obtained by adding to the polycarbonate various additives such as other type of thermoplastic resin, flame-retardant, impact resistance improver, antistatic agent, slip agent, anti-blocking agent, lubricant, defogging agent, natural oil, synthetic oil, wax, organic filler, inorganic filler, etc., within limits not prejudicial to the object of the present invention.

EXAMPLES

The present invention is explained in more detail in the following Examples, but it should be recognized that the scope of the present invention is not restricted to these Examples. The analyses and property evaluations of the obtained polycarbonates were made by the methods described below.

(1) Viscosity-average Molecular Weight (Mv)

Intrinsic viscosity [η] in methylene chloride at 20° C. was measured by an Ubbellohde viscometer, and viscosity-average molecular weight (Mv) was determined from the following equation.

$$[\eta]=1.23\times10^{-4}\times(MV)^{0.83}$$

(2) Terminal Oh Group Content

Colorimetric determinations were made according to the titanium tetrachloride/acetate method (Makromol. Chem. 88, 215 (1965)). The weight of the terminal OH groups vis-à-vis the polycarbonate weight was shown in ppm.

(3) Molecular Weight Distribution (Mw/Mn)

The molecular weight was determined by GPC with polystyrene calibration using a chromatograph HLC-8020 (Tosoh Corp.) with tetrahydrofuran as eluent, and Mw/Mn was calculated from the result of determinations.

(4) Dynamic Viscoelasticity

This was determined in the following way. The sample polycarbonate was dried at 120° C. for 5 hours and press molded into a shape of 25 mm in diameter and 1.5 mm in thickness at 25° C. to obtain a sample for measurement. The sample was dried in vacuo at 120° C. for 4 hours and then subjected to measurement. A viscoelastometer RDA-700 (Rheometrics Scientific Co., Ltd.) equipped with a 25 mmφ parallel plate type fixture was used, and the measuring atmosphere was set at 25° C. in a stream of nitrogen which satisfies the adaptation conditions of the viscoelastometer. The measuring temperature was set by measuring the temperature in the oven. Then the dried sample for measurement was set in position in the viscoelastomer and allowed to stand so that the whole sample would have the setting temperature, and measurement was made by rotating the sample with 10% strain at an angular velocity of 10 rad/s. From this measurement, loss tangent Tan δ and complex viscosity η* (Pa·s) were determined.

Further, the sample polycarbonate, dried at 120° C. for 5 hours, was injection molded by an injection molding machine M150AII-SJ (Meiki Seisakusho Ltd.) at a cylinder temperature of 280° C. to obtain the test pieces, and these test pieces were subjected to evaluation of flame retardancy and hydrolytic resistance.

(5) Impact Resistance

The polycarbonate was dried at 120° C. for 5 hours and then injection molded by an injection molding machine M150AII-SJ (mfd. by Meiki Seisakusho Co., Ltd.) at a cylinder temperature of 280° C. to make a test piece, and it was subjected to an ⅛ inch notched Izod impact test according to ASTM D-256 at room temperature (23° C.), 0° C. and −° C. The quotient of (frequency of ductile fracture)/(number of runs) was shown as ductility.

(6) Transferability

The polycarbonate was dried at 120° C. for 5 hours and then injection molded by an injection molding machine SG75-Sicap MII (mfd. by Sumitomo Heavy Industries Ltd.) under the conditions of 290° C. cylinder temperature, 90° C. mold temperature and one minute molding cycle by using a mold for evaluation having a grained cavity surface. The ten-point average roughness (Rz) of the molded product was measured according to JIS B 0601-1982, and the transfer rate for the nominal value of Rz (45.4 μm) of the mold for evaluation was determined.

Example 1

An example of the polycarbonate producing method according to the present invention is explained with reference to FIG. 1. FIG. 1 is a flow sheet of the production process in an embodiment of the present invention, in which reference numeral 1 indicates a diphenyl carbonate (DPC) tank, 2 agitators, 3 a bisphenol A (BPA) hopper, 4a and 4b material mixing tanks, 5 a DPC flow rate control valve, 6 a BPA flow rate control valve, 7 a pump, 8 a catalyst flow rate control valve, 9 a program control unit, 10 a pump, 11 a catalyst tank, 12 by-product discharge pipes, 13a, 13b and 13c vertical polymerizers, 14 Max Blend agitator, 15 a horizontal polymerizer, and 16 gate paddle agitators.

A melt of diphenyl carbonate prepared at 120° C. in a nitrogen gas atmosphere and a bisphenol A powder weighed in a nitrogen gas atmosphere were metered by a micromotion type flowmeter and a loss-in-weight type weight feeder so that they would be fed at the rates of 205.0 mol/h from the DPC tank (1) and 197.1 mol/h (material molar ratio: 1.040) from the BPA hopper (3), respectively, and continuously supplied to the material mixing tank (4a) adjusted to 140° C. in a nitrogen atmosphere. Then the mixed solution of materials was led into the material mixing tank (4b) and then continuously supplied to the 100-liter first vertical stirring polymerizer (13a) by pump (7). Simultaneously with start of supply of the said mixture, there also was started continuous supply of an aqueous solution of 2 wt % cesium carbonate to the polymerizer through its feed pipe at a flow rate of 1.1 mL/h (setting amount of catalyst: 0.35 μmol for one mole of bisphenol A).

In this operation, the actual control of catalyst flow rate was made in the program control unit (9) by calculating the setting flow rate of catalyst from the BPA flow rate detected by the BPA control valve (6) and the setting amount of catalyst, and controlling the opening of the catalyst flow rate control valve (8) so that the calculated value would tally with the catalyst flow rate actually metered by a metering device attached to the said control valve (8).

The first vertical stirring polymerizer (13a) provided with the Max Blend agitator (14) was controlled at 220°C. in a nitrogen atmosphere under normal pressure, and its liquid level was kept constant while controlling the opening of the valve provided in the polymer discharge line at the bottom of the polymerizer so that the average residence time would become 60 min.

The polymerized solution discharged from the bottom of the polymerizer was then successively supplied to the 100-liter vertical stirring polymerizers (13b, 13c) provided with the second and third Max Blend agitator (14), respectively, and further to the 150-liter horizontal polymerizer (15) provided with the fourth gate paddle agitator (16).

The reaction conditions in the second to fourth polymerizers were set so that the temperature and the degree of vacuum would increase while the stirring rate would decrease with the progress of the reaction as specified below.

|  | Temperature | Pressure | Stirring rate |
| --- | --- | --- | --- |
| 2nd polymerizer (13b) | 220° C. | $1.33 \times 10^4$ Pa | 110 rpm |
| 3rd polymerizer (13c) | 240° C. | $2.0 \times 10^3$ Pa | 75 rpm |
| 4th polymerizer (15) | 280° C. | $2.66 \times 10$ Pa | 10 rpm |

During the reaction, the liquid level was controlled so that the average residence time in the second to fourth polymerizers would become 60 minutes, and the phenol formed as a by-product in each polymerizer was removed through the by-product discharge pipe (12). The above operation was run for 1,500 hours continuously under the said conditions.

The polycarbonate drawn out from the polymer discharge port at the bottom of the fourth polymerizer was led in a molten state into a triple-vented twin-screw extruder where butyl p-toluenesulfonate was added in an amount of 2.8 ppm (4.5 times the neutralized amount of catalyst) based on the weight of the polycarbonate, and the mixture was hydrogenated, evaporated and then pelletized.

The viscosity-average molecular weight (Mv) and the terminal OH group content of the obtained polycarbonate were 21,800 and 500 ppm, respectively.

The time in which the actual amount of catalyst remained within the range of the setting amount of catalyst of ±0.06 μmol and ±0.1 μmol based on mole of the aromatic dihydroxyl compound was calculated from the data of continuous metering of catalyst flow rate metered by the metering device attached to the catalyst flow rate control valve (8) (this data being hereinafter referred to as "continuous metering data of catalyst flow rate control valve"). The percentages of the time satisfying the above specified ranges were 96.1% and 99.0%, respectively, of the whole production time. The molecular weight distribution (Mw/Mn) and the value of Tan $\delta/(\eta^*)^{-0.87}$ were 2.2 and 5,980, respectively. The thus obtained polycarbonate is designated PC-1.

Example 2

The same procedure as defined in Example 1 was carried out except that the polycarbonate drawn out from the polymer discharge port at the bottom of the fourth polymerizer was led in a molten state into a triple-vented twin-screw extruder, and that after adding butyl p-toluenesulfonate, hydrogenation and evaporation, there were further added, based on 100 parts by weight of the polycarbonate, 0.05 part by weight of stabilizer 1, 0.05 part by weight of stabilizer 2, 0.3 part by weight of UV absorber 1, 0.02 part by weight of release agent 1, 0.0001 part by weight of colorant 1 and 0.0001 part by weight of colorant 2, and the mixture was evaporated and pelletized. The polycarbonate used in this Example is the same as that of Example 1 except that the above additives were added, so that its viscosity-average molecular weight (Mv), terminal OH group content, molecular weight distribution (Mw/Mn) and Tan $\delta/(\eta^*)^{-0.87}$ are the same as those of PC-1 of Example 1: 21,800, 500 ppm, 2.2 and 5,980, respectively.

Example 3

The same procedure as defined in Example 1 was conducted except that the polycarbonate discharged from the polymer discharge port at the bottom of the fourth polymerizer was led in a molten state into a triple-vented twin-screw extruder, and that after adding butyl p-toluenesulfonate, hydrogenation and evaporation, there were further added, based on 100 parts by weight of the polycarbonate, 0.05 part by weight of stabilizer 1 and 0.05 part by weight of flame retardant 1, and the mixture was evaporated and then pelletized. The polycarbonate used in this Example is the same as that of Example 1 except that the above additives were added, so that its viscosity-average molecular weight (Mv), terminal OH group content, molecular weight distribution (Mw/Mn) and Tan $\delta/(\eta^*)^{-0.87}$ are the same as those of PC-1 of Example 1: 21,800, 500 ppm, 2.2 and 5,980, respectively.

Example 4

The same procedure as defined in Example 1 was conducted except that the catalyst flow rate was changed to 1.60 mL/h (setting amount of catalyst: 0.5 μmol for one mole of bisphenol A), that the pressure of the fourth polymerizer was set at $6.67 \times 10$ Pa, and that butyl p-toluenesulfonate was added in an amount of 4.0 ppm (4.4 times the neutralized amount of catalyst) based on the weight of the polycarbonate. The viscosity-average molecular weight (Mv) and the terminal OH group content of the obtained polycarbonate were 21,500 and 500 ppm, respectively.

The time in which the actual amount of catalyst remained within the range of the setting amount of catalyst of ±0.06 μmol and ±0.1 μmol for one mole of the aromatic dihydroxyl compound was calculated from the continuous metering data of catalyst flow rate control valve. The percentages of the time satisfying the above specified ranges were 96.7% and 99.1%, respectively, of the whole production time. The molecular weight distribution (Mw/Mn) and the value of Tan $\delta/(\eta^*)^{-0.87}$ were 2.3 and 4,850, respectively. This polycarbonate is designated PC-2.

Example 5

The same procedure as defined in Example 1 was conducted except that the temperature of the fourth polymerizer was set at 283°. The viscosity-average molecular weight (Mv) and the terminal OH group content of the obtained polycarbonate were 23,200 and 500 ppm, respectively.

The time in which the actual amount of catalyst remained within the range of the setting amount of catalyst of ±0.06 μmol and ±0.1 μmol for one mole of the aromatic dihydroxyl compound was calculated from the continuous metering data of catalyst flow rate control valve. The percentages of the time satisfying the above specified ranges were 96.5% and 99.3%, respectively, of the whole production time. The molecular weight distribution (Mw/Mn) and the value of Tan $\delta/(\eta^*)^{-0.87}$ were 2.2 and 5,720, respectively. This polycarbonate is designated PC-3.

Example 6

The same procedure as defined in Example 1 was conducted except that the setting molar ratio of the starting materials was adjusted to be 1.035 and the temperature of the fourth polymerizer was set at 285°. The viscosity-average molecular weight (Mv) and the terminal OH group content of the obtained polycarbonate were 25,300 and 530 ppm, respectively.

The time in which the actual amount of catalyst remained within the range of the setting amount of catalyst of ±0.06 μmol and ±0.1 μmol for one mole of the aromatic dihydroxyl compound was calculated from the continuous metering data of catalyst flow rate control valve. The percentages of the time satisfying the above specified ranges were 96.4% and 99.2%, respectively, of the whole production time. The molecular weight distribution (Mw/Mn) and the value of Tan $\delta/(\eta 1^*)^{-0.87}$ were 2.3 and 5,550, respectively. This polycarbonate is designated PC-4.

Comparative Example 1

The same procedure as defined in Example 4 was conducted except that no program control unit was installed, and that the catalyst flow rate was fixed at 1.6 mL/h (setting amount of catalyst: 0.5 μmol based on mole of bisphenol A). The obtained polycarbonate had a viscosity-average molecular weight (Mv) of 22,400 and a terminal OH group content of 500 ppm.

The time in which the actual amount of catalyst remained within the range of the setting amount of catalyst of ±0.06 μmol and ±0.1 μmol for one mole of the aromatic dihydroxyl compound was calculated from the continuous metering data of catalyst flow rate control valve. The percentages of the time satisfying the above specified ranges were 89.9% and 91.7%, respectively, of the whole production time. The molecular weight distribution (Mw/Mn) and Tan $\delta/(\eta^*)^{-0.87}$ were 2.7 and 2,240, respectively. This polycarbonate is designated PC-5.

Comparative Example 2

Bisphenol A was dissolved in dichloromethane and polycondensed by the interfacial method using triethylamine as polymerization catalyst, with the terminal closed with a phenol. The obtained polycarbonate had a viscosity-average molecular weight (Mv) of 22,100 and a terminal OH group content of 30 ppm. The molecular weight distribution (Mw/Mn) and Tan $\delta/(\eta^*)^{-0.87}$ were 2.3 and 7,550, respectively. This polycarbonate is designated PC-6.

Comparative Example 3

The same procedure as defined in Example 4 was conducted except that the temperature of the fourth polymerizer was set at 283° C. The viscosity-average molecular weight (Mv) and the terminal OH group content of the obtained polycarbonate were 23,500 and 520 ppm, respectively.

The time in which the actual amount of catalyst remained within the range of the setting amount of catalyst of ±0.06 μmol and ±0.1 μmol for one mole of the aromatic dihydroxyl compound was calculated from the continuous metering data of catalyst flow rate control valve. The percentages of the time satisfying the above specified ranges were 96.9% and 99.5%, respectively, of the whole production time. The molecular weight distribution (Mw/Mn) and the value of Tan $\delta/(\eta^*)^{-0.87}$ were 2.3 and 3,820, respectively. This polycarbonate is designated PC-7.

Comparative Example 4

The same procedure as defined in Example 4 was conducted except that the setting molar ratio of the starting materials was adjusted to be 1.035 and the temperature of the fourth polymerizer was set at 285° C. The viscosity-average molecular weight (Mv) and the terminal OH group content of the obtained polycarbonate were 25,400 and 590 ppm, respectively.

The time in which the actual amount of catalyst remained within the range of the setting amount of catalyst of ±0.06 μmol and ±0.1 μmol for one mole of the aromatic dihydroxyl compound was calculated from the continuous metering data of catalyst flow rate control valve. The percentages of the time satisfying the above specified ranges were 96.5% and 99.1%, respectively, of the whole production time. The molecular weight distribution (Mw/Mn) and the value of Tan $\delta/(\eta^*)^{-0.87}$ were 2.3 and 3,890, respectively. This polycarbonate is designated PC-8.

Comparative Example 5

The same procedure as defined in Comparative Example 4 was conducted except that no program control unit was installed, and that the catalyst flow rate was fixed at 1.6 mL/h (setting amount of catalyst: 0.5 μmol based on mole of bisphenol A). The obtained polycarbonate had a viscosity-average molecular weight (Mv) of 25,200 and a terminal OH group content of 530 ppm.

The time in which the actual amount of catalyst remained within the range of the setting amount of catalyst of ±0.06 μmol and ±0.1 μmol for one mole of the aromatic dihydroxyl compound was calculated from the continuous metering data of catalyst flow rate control valve. The percentages of the time satisfying the above specified ranges were 89.7% and 90.5%, respectively, of the whole production time. The molecular weight distribution (Mw/Mn) and the value of Tan $\delta/(\eta^*)^{-0.87}$ were 2.9 and 2,380, respectively. This polycarbonate is designated PC-9.

The materials used in the above Examples and Comparative Examples are as described below. Stabilizer 1: tris(2, 4-di-t-butylphenyl) phosphite Adekastab 2112 produced by Asahi Denka Kogyo KK) Stabilizer 2: pentaerythrityl-tetrakis[3-(3',5'-di-t-butyl-4'-hydroxyphenyl) propionate] (Irganox) 1010 produced by Ciba Specialty Chemicals Co., Ltd.) UV absorber 1: 2-(2'-hydroxy-5'-t-octylphenyl)-benzotriazole (Seesorb 709 produced by Shipro Kasei K.K.) Release agent 1: pentaerythritol tetrastearate (Unistar H-476 produced by NOF Corporation) Flame retardant 1: potassium salt of diphenylsulfone-3-sulfonic acid (KSS produced by GE Ltd.) Colorant 1: MACROLEX Blue RR produced by Bayer AG Colorant 2: MACROLEX Violet 3R produced by Bayer AG The evaluation results in Examples and Comparative Examples are shown in Table 1.

TABLE 1

|  | Ex. 1 | Ex. 2 | Ex. 3 | Ex. 4 |
|---|---|---|---|---|
| Percentage of time satisfying setting amount of catalyst (%) | | | | |
| ±0.06 μmol | 96.1 | — | — | 96.7 |
| ±0.1 μmol | 99.0 | — | — | 99.1 |
| Viscosity-average molecular weight (Mv) | 21800 | 21800 | 21800 | 21500 |
| Terminal OH group content (ppm) | 500 | 500 | 500 | 500 |
| Molecular weight distribution (Mw/Mn) | 2.2 | 2.2 | 2.2 | 2.3 |
| Complex viscosity $\eta^*$ (Pa · s) | 1840 | 1840 | 1840 | 1720 |
| Loss tangent Tan$\delta$ | 8.6 | 8.6 | 8.6 | 7.4 |
| Tan$\delta/(\eta^*)^{-0.87}$ | 5980 | 5980 | 5980 | 4850 |
| Formulation (Parts by weight) | | | | |
| Polycarbonate Type | PC-1 | PC-1 | PC-1 | PC-2 |
| Amount | 100 | 100 | 100 | 100 |
| Stabilizer 1 | — | 0.05 | 0.05 | — |
| Stabilizer 2 | — | 0.05 | — | — |
| UV absorber 1 | — | 0.3 | — | — |
| Release agent 1 | — | 0.02 | — | — |
| Flame retardant 1 | — | — | 0.05 | — |
| Colorant 1 | — | 0.0001 | — | — |
| Colorant 2 | — | 0.0001 | — | — |
| Evaluation results Impact resistance (J/m)/ | | | | |
| Ductility | | | | |
| At 23° C. | 810 | 820 | 820 | 780 |
|  | 10/10 | 10/10 | 10/10 | 10/10 |
| At 0° C. | 740 | 690 | 720 | 610 |
|  | 10/10 | 10/10 | 10/10 | 9/10 |
| At −30° C. | 100 | 90 | 100 | 100 |
|  | 0/10 | 0/10 | 0/10 | 0/10 |
| Transferability (%) | 80 | — | — | 87 |

|  | Comp. Ex. 1 | Comp. Ex. 2 | Ex. 5 | Comp. Ex. 3 |
|---|---|---|---|---|
| Percentage of time satisfying setting amount of catalyst (%) | | | | |
| ±0.06 μmol | 89.9 | — | 96.5 | 96.9 |
| ±0.1 μmol | 91.7 | — | 99.3 | 99.5 |

TABLE 1-continued

| | | | | |
|---|---|---|---|---|
| Viscosity-average molecular weight (Mv) | 22400 | 22100 | 23200 | 23500 |
| Terminal OH group content (ppm) | 500 | 30 | 500 | 520 |
| Molecular weight distribution (Mw/Mn) | 2.7 | 2.3 | 2.2 | 2.3 |
| Complex viscosity η* (Pa·s) | 2040 | 1860 | 2860 | 2990 |
| Loss tangent Tanδ | 3.0 | 10.8 | 5.6 | 3.6 |
| Tanδ/(η*)$^{-0.87}$ | 2240 | 7550 | 5720 | 3820 |
| Formulation (Parts by weight) | | | | |
| Polycarbonate Type | PC-5 | PC-6 | PC-3 | PC-7 |
| Amount | 100 | 100 | 100 | 100 |
| Stabilizer 1 | — | — | — | — |
| Stabilizer 2 | — | — | — | — |
| UV absorber 1 | — | — | — | — |
| Release agent 1 | — | — | — | — |
| Flame retardant 1 | — | — | — | — |
| Colorant 1 | — | — | — | — |
| Colorant 2 | — | — | — | — |
| Evaluation results | — | — | — | — |
| Impact resistance (J/m)/ Ductility | | | | |
| At 23° C. | 760 | 820 | 820 | 810 |
| | 10/10 | 10/10 | 10/10 | 10/10 |
| At 0° C. | 350 | 780 | 800 | 750 |
| | 4/10 | 10/10 | 10/10 | 10/10 |
| At −30° C. | 90 | 130 | 390 | 130 |
| | 0/10 | 0/10 | 5/10 | 0/10 |
| Transferability (%) | 90 | 68 | — | — |

| | Ex. 6 | Comp. Ex. 4 | Comp. Ex. 5 |
|---|---|---|---|
| Percentage of time satisfying setting amount of catalyst (%) | | | |
| ±0.06 μmol | 96.4 | 96.5 | 89.7 |
| ±0.1 μmol | 99.2 | 99.1 | 90.5 |
| Viscosity-average molecular weight (Mv) | 25300 | 25400 | 25200 |
| Terminal OH group content (ppm) | 530 | 590 | 530 |
| Molecular weight distribution (Mw/Mn) | 2.3 | 2.3 | 2.9 |
| Complex viscosity η* (Pa·s) | 4010 | 4180 | 4450 |
| Loss tangent Tanδ | 4.1 | 2.7 | 1.6 |
| Tanδ/(η*)$^{-0.87}$ | 5550 | 3890 | 2380 |
| Formulation (Parts by weight) | | | |
| Polycarbonate Type | PC-4 | PC-8 | PC-9 |
| Amount | 100 | 100 | 100 |
| Stabilizer 1 | — | — | — |
| Stabilizer 2 | — | — | — |
| UV absorber 1 | — | — | — |
| Release agent 1 | — | — | — |
| Flame retardant 1 | — | — | — |
| Colorant 1 | — | — | — |
| Colorant 2 | — | — | — |
| Evaluation results | — | — | — |
| Impact resistance (J/m)/ Ductility | | | |
| At 23° C. | 820 | 820 | 800 |
| | 10/10 | 10/10 | 10/10 |
| At 0° C. | 820 | 810 | 720 |
| | 10/10 | 10/10 | 10/10 |
| At −30° C. | 730 | 300 | 110 |
| | 10/10 | 2/10 | 0/10 |
| Transferability (%) | — | — | — |

What is claimed is:

1. A polycarbonate which can be obtained by a melting method using an aromatic dihydroxyl compound and a carbonic acid diester as starting materials and has a viscosity-average molecular weight of 16000 to 27000, and whose loss angle δ and complex viscosity η* (Pa·s) measured under the conditions of 250° C. and an angular velocity of 10 rad/s satisfy the following relation (1):

$$4{,}700 \leq \text{Tan } \delta/(\eta^*)^{-0.87} \tag{1}$$

2. A polycarbonate according to claim 1 having a terminal OH group content in the range of 50 to 1,000 ppm.

3. A polycarbonate resin composition comprising a polycarbonate which can be obtained by a melting method using an aromatic dihydroxyl compound and a carbonic acid diester as starting material and has a viscosity-average molecular weight of 16000 to 27000, and whose loss angle δ and complex viscosity η* (Pa·s) measured under the conditions of 250° C. and an angular velocity of 10 rad/s satisfy the following relation (1):

$$4{,}700 \leq \text{Tan } \delta/(\eta^*)^{-0.87} \tag{1}$$

4. A polycarbonate composition according to claim 3, wherein a terminal OH group content of the polycarbonate is 50 to 1,000 ppm.

5. A polycarbonate resin composition according to claim 3 containing at least one additive selected from stabilizer, ultraviolet absorber, release agent, flame retardant and colorant.

6. A polycarbonate resin composition according to claim 5 wherein the stabilizer is at least one antioxidant selected from the hindered phenol compounds and phosphorus compounds.

7. A polycarbonate resin composition according to claim 5, wherein the ultraviolet absorber is at least one compound selected from benzotriazole compounds, 2-(4,6-diphenyl-1,3,5-triazine-2-yl)-5-[(hexyl)oxy]-phenol, 2-[4,6-bis(2,4-dimethylphenyl)-1,3,5-triazine-2-yl]-5-(octyloxy)phenol, 2,2'-(1,4-phenylene)bis[4H-3,1-benzoxadine-4-one], and [(4-methoxyphenyl)-methylene]-propanedioic acid-dimethyl ester.

8. A polycarbonate resin composition according to claim 5, wherein the release agent is at least one compound selected from the aliphatic carboxylic acids and aliphatic carboxylic acid esters.

9. A polycarbonate resin composition according to claim 5, wherein the flame retardant is at least one compound selected from the metal salt of sulfonic acid compounds.

10. A polycarbonate resin composition according to claim 5, wherein the colorant is a compound having an anthraquinone skeleton.

11. A polycarbonate resin composition according to claim 5, wherein the additives are added (a) in the course of the polymerization reaction for producing the polycarbonate as defined in claim 1, (b) at the end of said polymerization reaction, or (c) after deactivation of the catalyst used for the polymerization by a catalyst deactivator and before pelletization.

* * * * *

UNITED STATES PATENT AND TRADEMARK OFFICE
CERTIFICATE OF CORRECTION

PATENT NO.   : 6,730,725 B2
DATED        : May 4, 2004
INVENTOR(S)  : T. Masuki et al.

It is certified that error appears in the above-identified patent and that said Letters Patent is hereby corrected as shown below:

Column 22,
Lines 10 and 24, after "$4{,}700 \leq \tan \delta / (\eta^*)^{-0.87}$", please insert -- $\leq 7{,}000$ --

Signed and Sealed this

Twenty-first Day of December, 2004

JON W. DUDAS
*Director of the United States Patent and Trademark Office*